No. 825,706. PATENTED JULY 10, 1906.
J. A. DYBLIE.
VALVE MECHANISM.
APPLICATION FILED AUG. 7, 1903.
2 SHEETS—SHEET 1.
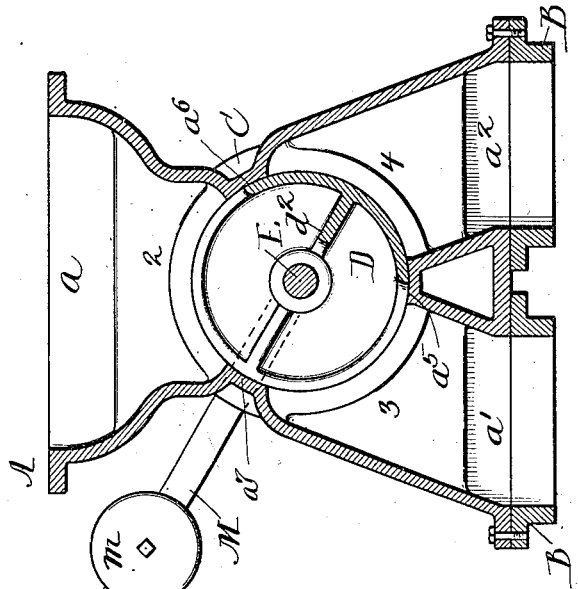
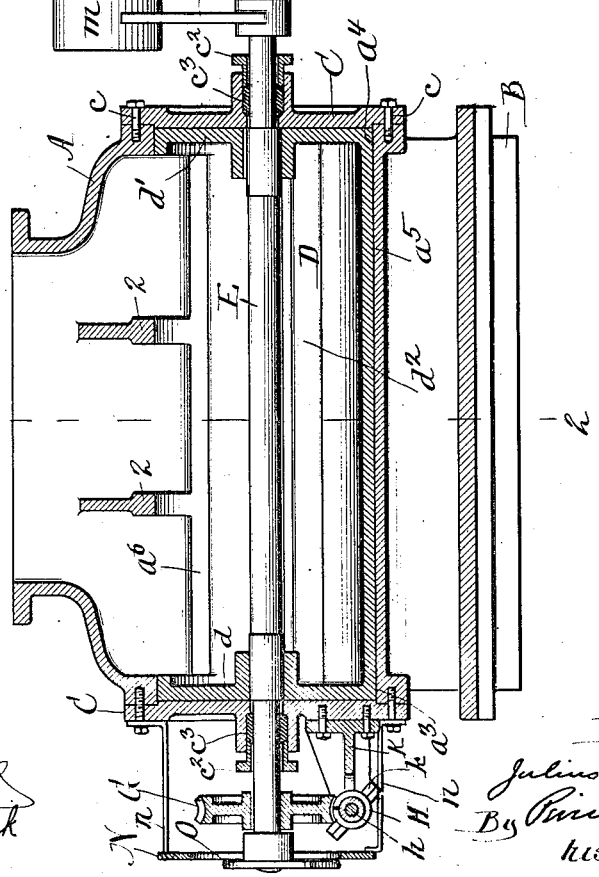
Witnesses:
Fred Gerlach
Alberta Adamick
Inventor:
Julius A. Dyblie
By Pinn & Fisher
his Attorneys.

No. 825,706. PATENTED JULY 10, 1906.
J. A. DYBLIE.
VALVE MECHANISM.
APPLICATION FILED AUG. 7, 1903.
2 SHEETS—SHEET 2.
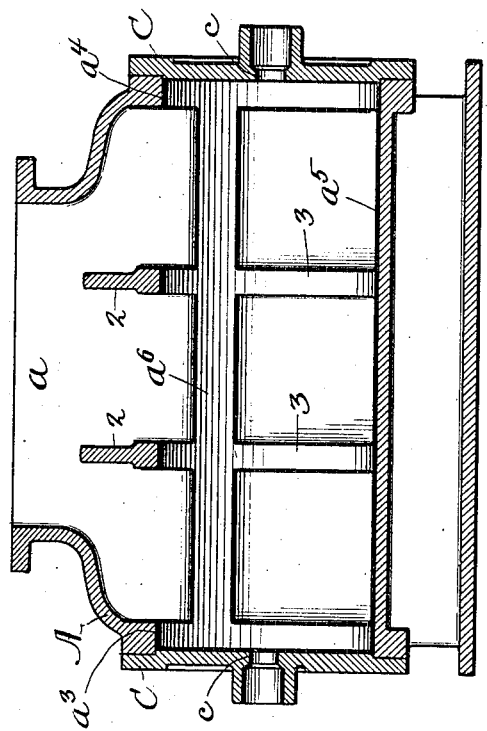
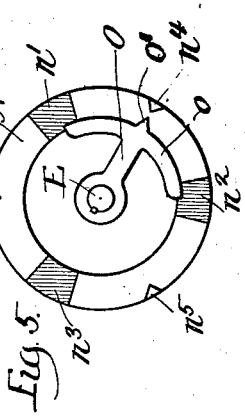
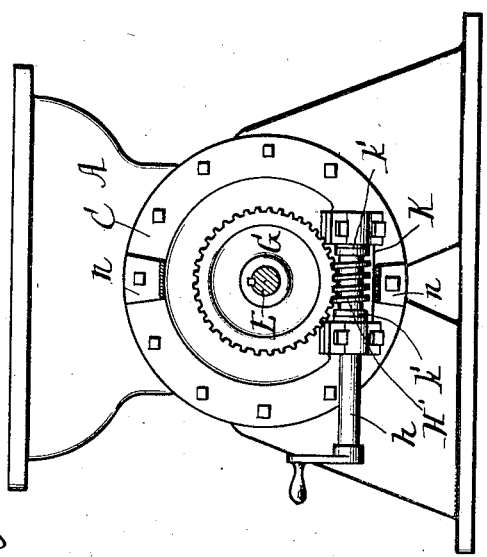
Witnesses
Fred Gerlach
Alberta Adamick
Inventor
Julius A. Dyblie
By Prine Fisher
his Attorneys

UNITED STATES PATENT OFFICE.

JULIUS A. DYBLIE, OF JOLIET, ILLINOIS.

VALVE MECHANISM.

No. 825,706.  Specification of Letters Patent.  Patented July 10, 1906.

Application filed August 7, 1903. Serial No. 168,558.

*To all whom it may concern:*

Be it known that I, JULIUS A. DYBLIE, a citizen of the United States, and a resident of Joliet, county of Will, and State of Illinois, have invented certain new and useful Improvements in Valve Mechanism, of which the following is a full, clear, and exact description.

The present invention has primarily for its object to provide an improved three-way rotary valve the construction of which shall especially adapt it for use with the blowing-engines of metallurgical plants.

In supplying wind to metallurgical furnaces it is frequently desirable to admit air to either one of two main pipes from the same blowing engine or engines, and where several engines are used for furnishing wind to two or more furnaces it is desirable to be able to use either engine for supplying wind to either furnace. Heretofore it has been customary to employ gate-valves between the blowing-engines and the pipes leading to the mains whereby the furnaces were supplied with wind; but such gate-valves are objectionable for many reasons, and their objections are obviated by this invention.

The invention consists in the features of improvement hereinafter described, illustrated in the accompanying drawings, and more particularly pointed out in the claims at the end of this specification.

Figure 1 is a view in central longitudinal section through the valve mechanism embodying my invention. Fig. 2 is a view in transverse section on line 2 2 of Fig. 1. Fig. 3 is an end view. Fig. 4 is a view in longitudinal section through the casing and its heads, the rotary valve being removed. Fig. 5 is a detail end view showing the dial-plate and pointer.

A designates the body or casing of my improved valve mechanism, this body or casing being preferably formed of cast-iron. One side of the valve-casing A is provided with an admission-channel $a$, that will be suitably connected with the blowing-engine, and the opposite side of the casing A is formed with the channels $a'$ and $a^2$, to which may connect the pipes that lead to the main or trunk pipes whereby air is delivered to the furnaces. As shown, the channels $a$, $a'$, and $a^2$ are cast integral with the body of the casing, the channels $a'$ and $a^2$ being preferably of oblong construction and being shown as formed with flanged rings B, to which the wind-pipes will be bolted. The ends of the valve-casing A are open and terminate in the annular seats $a^3$ and $a^4$, and the ends of the casing are adapted to be closed by the heads C, that are bolted, as at $c$, to the ends of the casing. The ends of the casing are bored to form true seats for the valve, as will presently appear, and from end to end of the casing extend the bearing-surfaces $a^5$, $a^6$, and $a^7$, that are bored to conform in curvature to the curvature of the valve D within the casing. Within the valve-casing and between the seats $a^5$, $a^6$, and $a^7$ extend the several segmental webs 2, 3, and 4, the inner edges of which are bored to conform in curvature to the bearing-surfaces at the ends of the casing, these segmental webs or bars serving not only to give the required strength to the casing, but also to afford bearings for the valve at points intermediate the ends of the casing.

The cylindrical casing-heads C are formed with central openings $c$ therein, through which extend the ends of a shaft E, whereon the valve D is fixed. The holes $c$ in the heads C of the casing are formed slightly larger in diameter than the shaft E, the purpose of which construction will presently appear, and upon the outside of the casing-heads C are preferably formed the stuffing-boxes $c^3$, that are fitted with glands $c^2$ for the ends of the shaft E.

The valve D is of segmental outline and is preferably formed of cast metal. At the ends of the valve D are formed the cylindrical plates $d$ and $d'$, through which passes the shaft E, that is keyed thereto. As shown, the valve D is strengthened by a central web $d^2$, extending from end to end thereof and extending upward also to the top of the cylindrical end plates $d$ and $d'$. By reference more particularly to Fig. 2 of the drawings it will be seen that the width of the valve D is sufficient to enable it to span either of the ports of the valve-chamber that leads to the channels $a$, $a'$, and $a^2$.

From the construction of parts as thus far defined it will be seen that when the valve D is in the position shown in Fig. 2 of the drawings air will pass freely from the blowing-engine through the admission-channel $a$ of the valve-casing A and through the discharge-channel $a'$ to one of the wind-delivery mains of the system, the channel $a^2$, leading to the other delivery main, being at such time closed by the valve D. Inasmuch as the openings $c$ in the valve-casing heads C are of slightly greater diameter than the shaft E, that carries the valve D, it will be seen that the pressure of air upon the inner face of the segmental valve will serve to hold the valve firmly against the bearing-surface $a^5$ and $a^6$, and thus prevent serious leakage of air through the channel $a'$. It will also be seen that by turning the valve D through the medium of its shaft E the passage of air through the discharge-channel $a^2$ can be cut off.

In order to permit the valve D to be conveniently operated, I prefer to employ the worm-gearing next to be described. On one end of the valve-shaft E is keyed a worm-wheel C, with which meshes a worm H, that is journaled in bearings $k$ on the bracket K. The journals of the worm-shaft $h$ are held in place in their bearings by means of flanged caps $k'$, that are bolted to the flanges $k^2$ of the bracket K. The base of the bracket K is preferably bolted, as shown, to one of the cylindrical heads C of the valve-casing, and by preference the bracket is of the bifurcated construction shown, its arms being strengthened by webs of cast metal. One end of the worm-shaft $h$ will be fitted with a suitable handle, whereby the worm may be conveniently operated.

In order to enable the attendant to readily determine the position of the valve D within the casing, I prefer to attach to the extreme outer end of the shaft E an indicator or pointer O, the hub of this indicator being fixed to the shaft E. Preferably the indicator O is provided with a segmental section $o$, corresponding in shape, extent, and position on the shaft to the valve D, and is provided also with a center pointer $o'$, (see Fig. 5,) and the indicator O is arranged to travel around the face of the dial N, that is mounted upon brackets $n$, extending outwardly from one of the casing-heads C. (See Fig. 1.) Preferably the annular dial N has its face colored, as indicated at $n'$, $n^2$, and $n^3$, these colored or contrasting portions corresponding in location and extent to the seats $a^5$, $a^6$, and $a^7$ upon the interior of the casing. As shown, also, the indicator is provided with points $n^4$, $n^5$, and $n^6$, centrally disposed upon the spaces of the dial, that correspond to the open spaces or ports of the casing. By examining the indicator O the attendant can see at a glance the exact position of the valve within the casing and can know whether the valve be in open or closed position.

The end of the valve-shaft E opposite that end that carries the worm-wheel G is shown as provided with a counterbalance-lever M, carrying an adjustable weight $m$, the lever being keyed to the shaft E. It will be understood, of course, that the counterbalance-lever will be arranged upon the shaft opposite the valve D, and with the lighter constructions of valve the counterbalance-lever may be omitted altogether.

It is obvious that the precise details of construction above set out may be varied by the skilled mechanic without departure from the scope of the invention.

Having thus described my invention, what I claim as new, and desire to secure by Letters Patent, is—

1. Valve mechanism of the character described comprising a horizontal casing provided with an admission-channel and a plurality of discharge-channels and having circular bearing-surfaces and detachable heads at its ends, of the horizontal segmental valve extending from end to end of said casing for controlling said admission and discharge channels, circular end plates or disks rigidly secured to the ends of said valve and arranged within said bearing-surfaces, and a shaft passing through the heads of said casing, to which shaft the plates or disks of said valve are rigidly secured, substantially as described.

2. Valve mechanism of the character described comprising a casing provided with an admission-channel and with a plurality of discharge-channels, detachable heads for the ends of said casing provided with stuffing-boxes, a segmental valve within said casing and extending from end to end thereof, a shaft to which said valve is rigidly secured, extending through the ends of the casing and of materially smaller diameter than the openings in said ends to allow the pressure within the casing to force the valve to its seat, and means for turning said shaft to shift the valve.

3. Valve mechanism of the character described comprising a casing provided with an admission-channel and with a plurality of discharge-channels, said casing having circular bearing-surfaces at its ends, a segmental valve extending from end to end of said casing and provided at its ends with circular plates arranged within the bearing-surfaces at the ends of the casing, a shaft extending through the ends of said casing upon which shaft the end plates of said valve are rigidly secured, said valve and its end plates being formed integral.

4. Valve mechanism of the character described comprising a casing provided with an admission-channel and with a plurality of discharge-channels, said casing having at its ends circular bearing-surfaces and having intermediate said ends one or more transverse segmental bearing-surfaces and having also longitudinal bearing-surfaces extending from end to end of the casing, a segmental valve mounted within said casing and provided with end plates fitting in the annular bearing-surfaces of the casing and means for turning said valve.

5. In valve mechanism of the character described, the combination with a casing having a cylindrical valve-seat provided with an admission-port and a plurality of discharge-ports arranged in circular series in said seat, of a shaft journaled in and projecting from the ends of said casing, a segmental valve for controlling said ports fixed to said shaft and arranged on one side thereof, operating-gearing for said shaft connected to the projecting end thereof, a dial exteriorly fixed on the end of said casing and surrounding the end of said shaft and having the cylindrical valve-seat and ports indicated thereon, and an indicating-arm secured to the outer end of said shaft in proximity to said dial and provided with a segmental portion corresponding to said segmental valve, substantially as described.

6. Valve mechanism of the character described comprising a casing provided with an admission channel or port and with a plurality of discharge channels or ports extending from end to end thereof, longitudinally-extending bearing-surfaces between said ports, transverse segmental webs between said longitudinal bearing-surfaces and bridging said ports, said longitudinal bearing-surfaces and said webs being bored to form a circular valve-seat, circular openings in the ends of the valve-casing in line with said valve-seat, heads detachably secured to said valve-casing over said openings, a shaft extending through said valve-casing journaled in said heads, a segmental valve fitting within the circular valve-seat of the casing and arranged to close any one of said ports, said valve having circular end plates or disks rigidly secured to said shaft and fitting within the circular openings at the end of the valve-casing, all substantially as and for the purposes set forth.

JULIUS A. DYBLIE.

Witnesses:
LILLIAN PRENTICE,
FRED GERLACH.